United States Patent [19]

Tinkham

[11] 4,300,482
[45] Nov. 17, 1981

[54] FUEL SYSTEM

[76] Inventor: Sherman L. Tinkham, 1406 E. Lotus Path, Clearwater, Fla. 33516

[21] Appl. No.: 99,340

[22] Filed: Dec. 3, 1979

[51] Int. Cl.³ .................. F02B 45/04; F02D 19/04
[52] U.S. Cl. ........................... 123/23; 60/39.46 S
[58] Field of Search .................. 123/23, 24, 1 A; 60/39.46 R, 39.46 M, 39.46 S, 39.47

[56] References Cited

U.S. PATENT DOCUMENTS

| 1,061,469 | 5/1913 | Gobbe | 60/39.46 S |
| 1,656,678 | 1/1928 | Pawlikowski | 123/23 |
| 1,696,475 | 12/1928 | Elliott et al. | 123/23 |
| 2,396,524 | 3/1946 | Nettel | 123/23 |
| 2,439,748 | 4/1948 | Nettel | 123/23 |
| 4,125,093 | 11/1978 | Platzer | 123/494 |

FOREIGN PATENT DOCUMENTS

| 503765 | 7/1930 | Fed. Rep. of Germany | 123/23 |
| 544542 | 9/1922 | France | 123/23 |

Primary Examiner—Craig R. Feinberg
Attorney, Agent, or Firm—Stanley M. Miller

[57] ABSTRACT

An improved solid fuel carburetor is disclosed for an internal combustion engine or furnace. A solid fuel supply mechanism advances a cake of compressed, powdered, combustible fuel into an operative position in a mixing chamber. A rotary brush mechanism positioned proximately to the fuel supply mechanism, contacts the fuel cake and abrasively removes fuel particles therefrom in the mixing chamber. An air supply is provided proximate to the brush mechanism for mixing air with the removed fuel particles forming a combustible mixture in the mixing chamber. A delivery mechanism is connected between the mixing chamber and internal combustion engine or furnace, for delivering the combustible mixture to the combustion chamber. The resultant solid fuel carburetor provides a more convenient and safe mechanism for delivering solid state combustible materials to an internal combustion engine or furnace.

26 Claims, 11 Drawing Figures

SEC. 6-6'

SEC. 2-2'

SEC. 5-5'

FUEL SYSTEM

FIELD OF THE INVENTION

The invention disclosed broadly relates to internal combustion engines and furnaces and more particularly relates to improvements in solid fueled internal combustion engines and furnaces.

BACKGROUND OF THE INVENTION

In an internal combustion engine, a fuel-air mixture is burned so that the hot gaseous products exert a force on moving parts of the machine, doing useful work and generating power. In the internal combustion engine, the products of combustion act directly on pistons or turbine rotor blades. The first practical internal combustion engine was developed by Otto and Langen in 1876, which was the first four-stroke-cycle engine employing compression and operating on the principle of modern automobile engines.

The familiar four-stroke-cycle Otto engine employs a piston connected to a crank shaft, and disposed in a combustion cylinder connected to a fuel mixture source by an inlet valve and to an exhaust port by an exhaust valve. The piston first descends on the intake stroke, during which the inlet valve is held open. The fuel mixture is moved into the cylinder by the partial vacuum created by the descent of the piston. The piston then ascends on the compression stroke with both valves closed and the fuel mixture is ignited by an electric spark as the end of the stroke is approached. The power stroke follows, with both valves still closed and the gas pressure from the combustion of the fuel mixture into its gaseous raction products, acting on the piston because of its expansion. The exhaust stroke then completes the cycle with the ascending piston forcing the spent reaction products of the combustion pass the exhaust valve, now held open. The cycle then repeats itself, each cycle thus requiring four strokes of the piston; intake, compression, power and exhaust, and two revolutions of the crankshaft.

A wide variety of internal combustion engines have resulted from the requirements of an extensive range of possible applications. These various applications have been made in the automotive, aviation, marine and stationary fields. Of these, the automotive field is the most important because of the number of engines in use and the total power developed. However, all of these modern internal combustion engines employ petroleum products such as gasoline or fuel oil as their fuel. Indeed, the history of the internal combustion engine is contemporary with and dependent upon the development of the modern petroleum industry. Although petroleum has been known to man from ancient times, its use was limited to lighting, lubrication, and adhesive applications. The modern petroleum industry dates from the successful drilling of an oil well at Titusville, Pa. in 1859, which occurred just a few years before the development of the Otto four-stroke internal combustion engine.

By 1900, world production of petroleum had increased to 100 million barrels per year, stimulated by the increased uses found for the internal combustion engine. As the 20th century has progressed, fuels derived from petroleum have accounted for half of the world's total supply of energy and are used not only to power the engines of automobiles, tractors, trucks, ships, airplanes and missiles, but also the furnaces used to heat buildings. Either directly by combustion or indirectly through the generation of electricity, petroleum supplies most people of the world with artificial light. By the end of the 1970s, the world wide demand for petroleum has increased to over 60 million barrels per day. However, the world wide published, proven reserves of petroleum remain relatively fixed and, through the market manipulations by international cartels and through interruptions in the refining and distribution of petroleum products, critical shortages in the supply of petroleum products to consumers have begun to occur.

A great deal of attention has been recently brought to bear on alternate energy sources which can substitute for petroleum. Alternate fossil fuels such as coal are not in short supply and indeed it is estimated that at existing consumption levels, the proven reserves of coal could supply the world's needs for 400 years.

Interest in solar energy has also increased. Solar technologies can be classified into natural collection systems such as green plants and technological collection systems such as thermal or photovoltaic technologies. The simpler technology is the use of biomass for energy, which includes any form of matter that is living or was once part of a living organism, for example, leaves, wood, corn cobs, pea pods, algae, bacteria, kelp, and manure. Although the efficiency of conversion of solar energy by growing plants is only about one percent, the United States has 900 million acres of land under cultivation for lumber, paper and food. Either through direct burning or conversion to specialty fuels, the residues associated with forestry and agricultural operations alone could provide as much as 10 percent of the United States' energy needs. Densified biomass fuel is now being made from saw dust, bark, corn cobs, pea pods or coffee grounds by drying these materials to a moisture content of about 10% and compressing them into bricks or pellets. In this form, the biomass has an energy content higher than many coals and is easy to ship and store.

The basic practical problem now is how to convert existing solid fuels composed of coal or biomass into a suitable medium for combustion in an internal combustion engine or furnace.

OBJECTS OF THE INVENTION

It is therefore an object of the invention to provide an improved means for combusting solid state fuels in an internal combustion engine or furnace.

It is still another object of the invention to provide an improved means for combusting coal and other solid state fossil fuel in an internal combustion engine or furnace.

It is yet a further object of the invention to provide an improved means for combusting biomass fuels in an internal combustion engine or furnace.

It is still a further object of the invention to provide an improved means for combusting solid state fuels in an internal combustion engine or furnace, which is easier and safer to handle.

SUMMARY OF THE INVENTION

These and other objects, features and advantages of the invention are accomplished by the fuel system disclosed herein. An improved solid fuel carburetor is disclosed for an internal combustion engine or furnace. A solid fuel supply mechanism advances a cake of compressed, powdered, combustible fuel into an operative position in a mixing chamber. A rotary brush mechanism positioned proximately to the fuel supply mechanism, contacts the fuel cake and abrasively removes fuel particles therefrom in the mixing chamber. An air supply is provided proximate to the brush mechanism for mixing air with the removed fuel particles forming a combustible mixture in the mixing chamber. A delivery mechanism is connected between the mixing chamber and internal combustion engine or furnace, for delivering the combustible mixture to the combustion chamber. The resultant solid fuel carburetor provides a more convenient and safe mechanism for delivering solid state combustible materials to an internal combustion engine or furnace.

DESCRIPTION OF THE FIGURES

These and other objects, features and advantages of the invention will be more fully appreciated with reference to the accompanying figures.

DISCUSSION OF THE PREFERRED EMBODIMENT

An improved solid fuel carburetor is disclosed for an internal combustion engine or furnace. A solid fuel supply mechanism advances a cake of compressed, powdered, combustible fuel into an operative position in a mixing chamber. A rotary brush mechanism positioned proximately to the fuel supply mechanism, contacts the fuel cake and abrasively removes fuel particles therefrom in the mixing chamber. An air supply is provided proximate to the brush mechanism for mixing air the the removed fuel particles forming a combustible mixture in the mixing chamber. A delivery mechanism is connected between the mixing chamber and internal combustion engine or furnace, for delivering the combustible mixture to the combustion chamber. The resultant solid fuel carburetor provides a more convenient and safe mechanism for delivering solid state combustible materials to an internal combustion engine or furnace.

Figure 6:
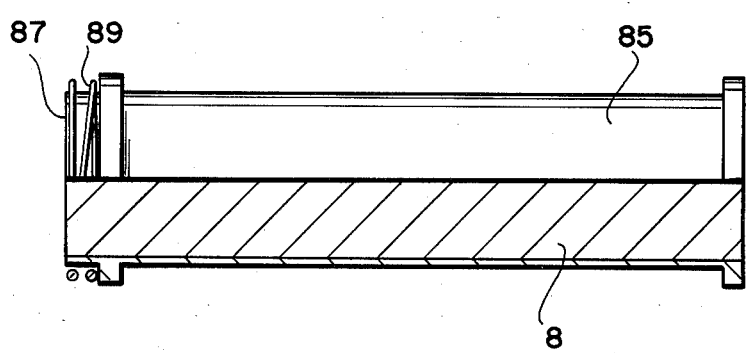
FIG. 6 is a side, cross-sectional view along the section line 6—6' of FIG. 4, of the solid fuel cartridge for the fuel system invention.

The improved solid fuel carburetor invention is based upon the abrasive liberation of combustible dust particles of the solid fuel which have been compressed into a cake such as is shown in FIG. 6. The explosive quality of dust suspended in air is governed by its fineness and its chemical composition. The optimum concentration of various types of air suspended dust giving maximum explosibility is given as follows. The size of these dusts is such that all will pass through a 200 mesh sieve (200 holes per linear inch). Concentrations of coal dust which give maximum explosibility range from 200 to 600 ounces per thousand cubic feet. Concentrations of sugar dust which give maximum explosibility range from 200 to 1000 ounces per one thousand cubic feet. And concentrations of corn, wheat or starch dust which give maximum explosibility range from 200 to 600 ounces per one thousand cubic feet. The ignition of such concentrations of air-dust mixtures may be carried out by an electric spark such as is produced by a conventional spark plug in an internal combustion engine. Solid state compositions of these materials may be ground into powders of less than 200 mesh and may be compressed, with the assistance of hydrocarbon binders, into cakes such as the fuel cake 8 shown in FIG. 6.

Figure 1:
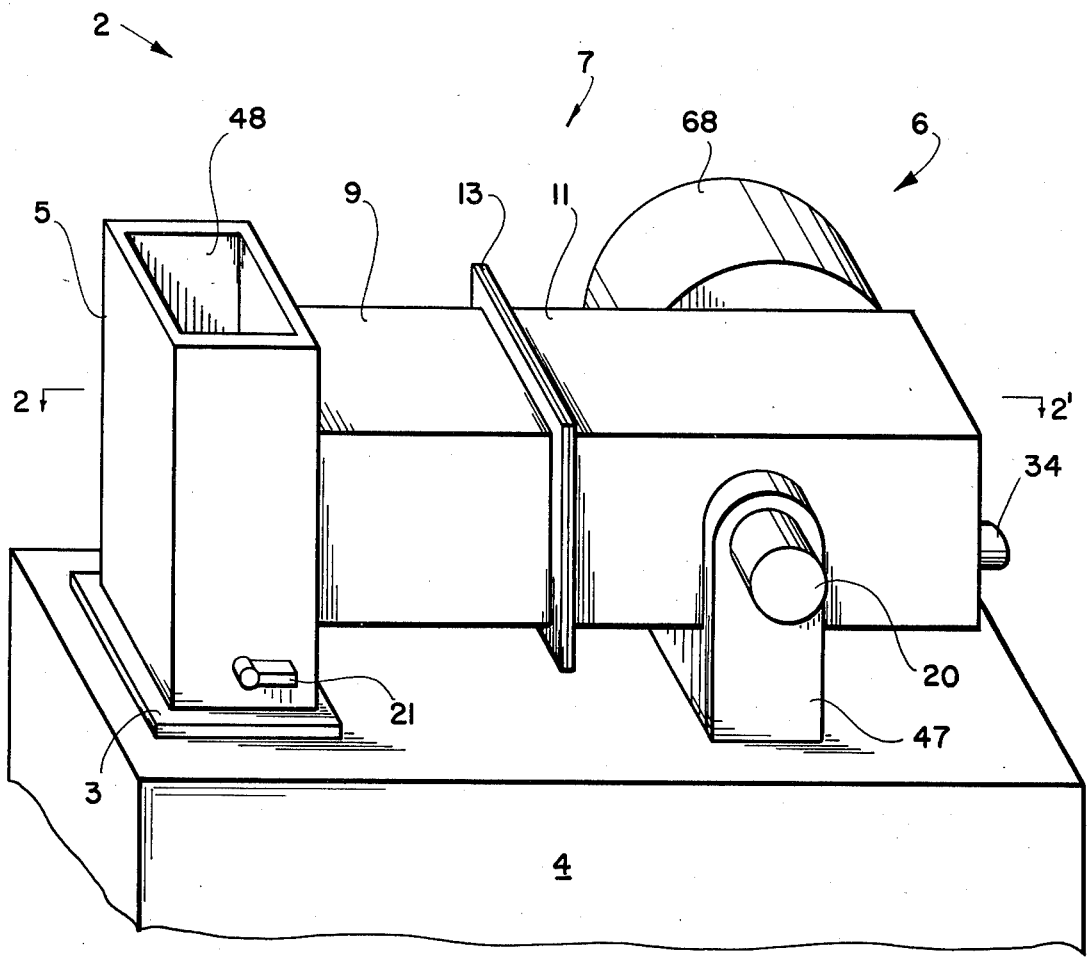
FIG. 1 is an overall isometric view of the fuel system invention.

The improved solid fuel carburetor 2 is shown mounted to the internal combustion engine 4 in the isometric view of FIG. 1. FIGS. 2, 3, 4 and 5 show various views of the carburetor 2. In its overall structure, the carburetor 2 is mounted by means of the flange 3 to the intake manifold 49 of the internal combustion engine 4. The major structural parts of the carburetor 2 include the vertical housing 5 which is mounted to the flange 3, the top of which has the system inlet 48 for the introduction of ambient or supercharged air. Mounted by means of a flange 15 on the side of the vertical housing 5 is the horizontal housing 7 which consists of a first portion 9 mounted by means of the flange 15 to the vertical housing 5 and a second portion 11 mounted by means of the flange 13 to the first portion 9. The first portion 9 of the horizontal housing 7 envelopes the swirl chamber 36 and the second portion 11 of the horizontal housing 7 envelopes the mixture chamber 12 for the system. A rotary fuel supply drum 68 is pivotally mounted on the pivot 17 to the second portion 11 of the horizontal housing 7 and contains a plurality of the solid fuel cakes 8 and 8' which can be sequentially loaded into the operative position 10.

Figure 2:
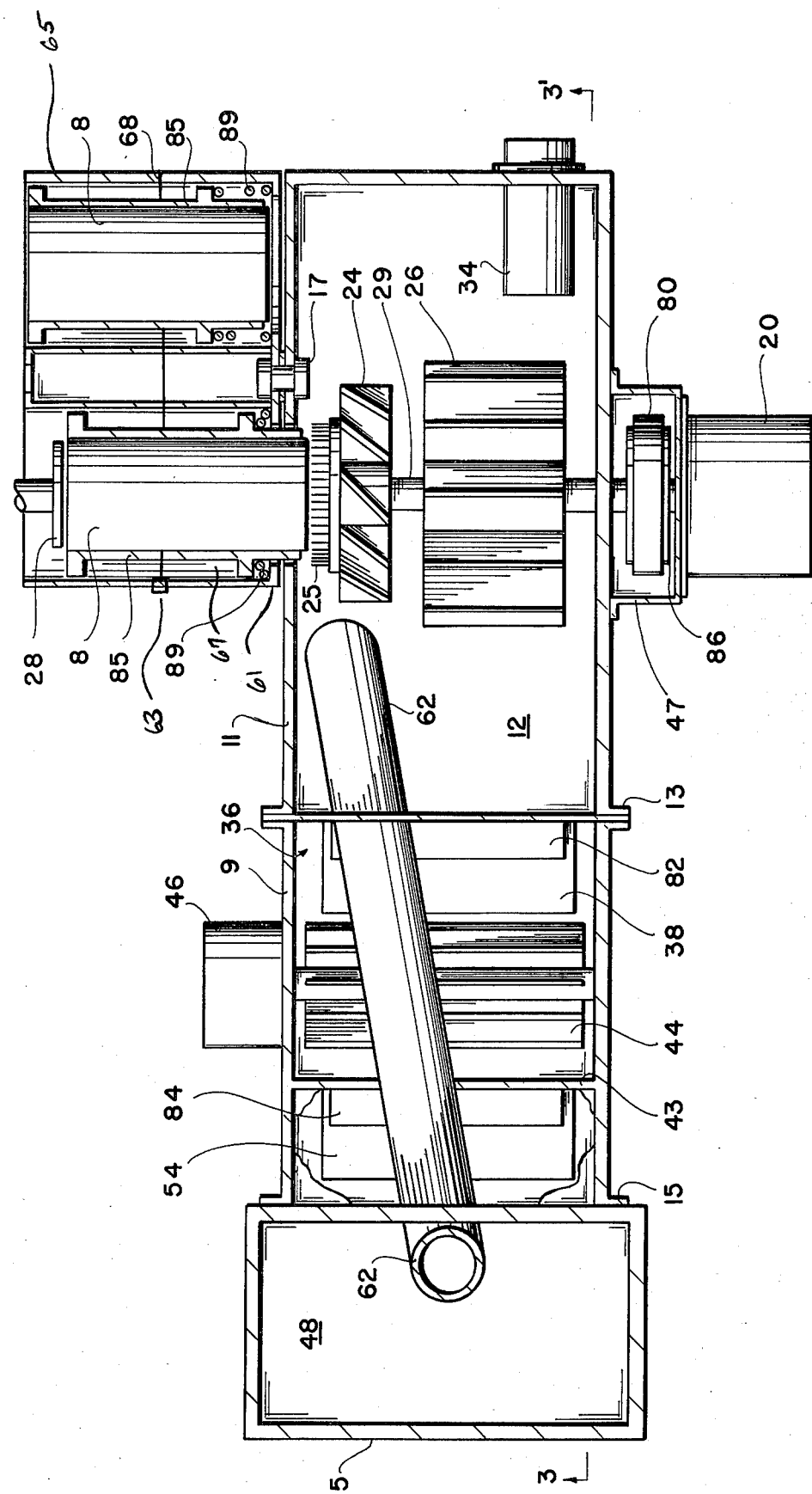
FIG. 2 is a top, cross-sectional view along the section line 2—2' of FIG. 1, of the fuel system invention.
Figure 5:
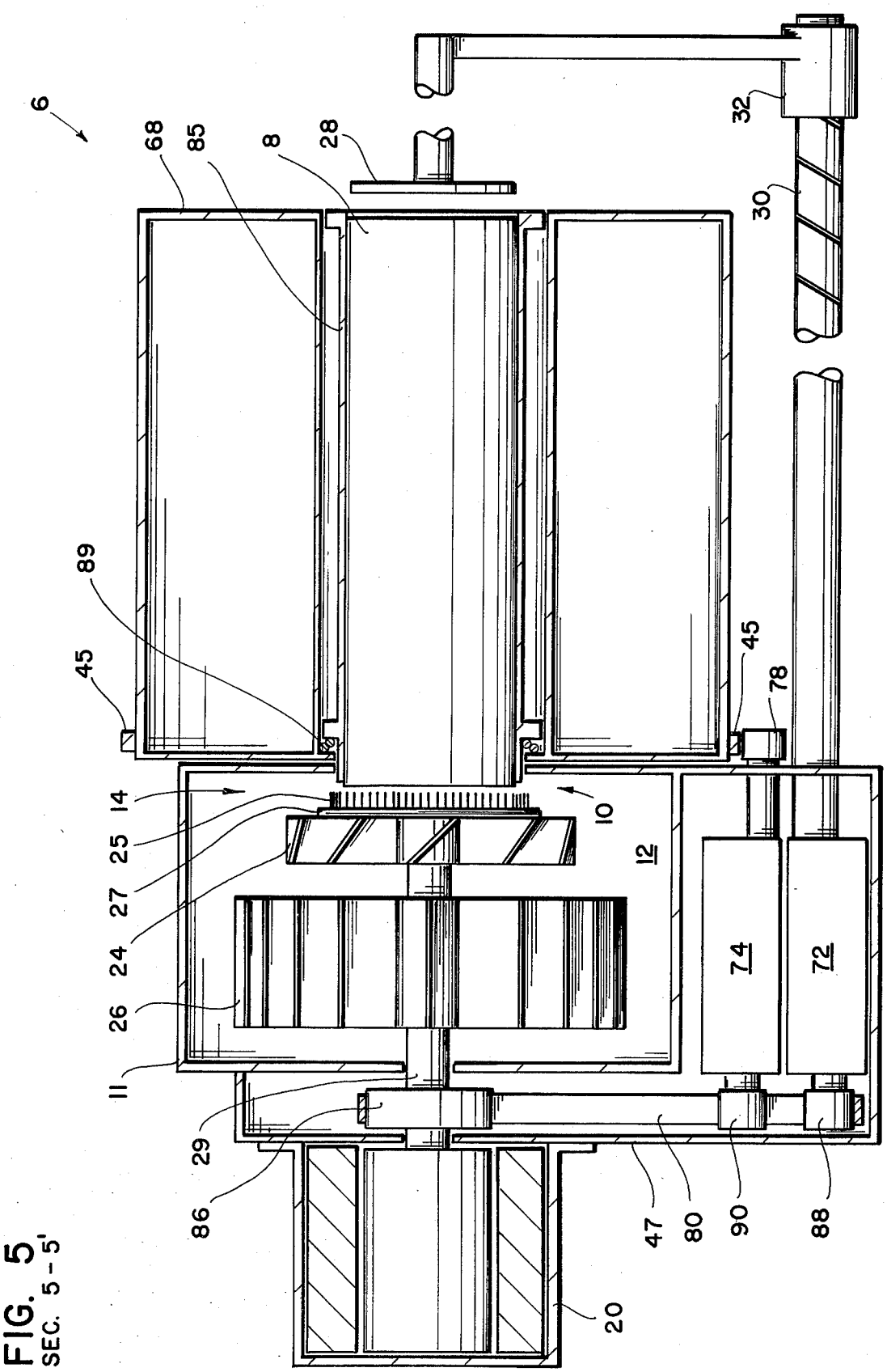
FIG. 5 is an end, cross-sectional view along the section line 5—5' of FIG. 4.

More particularly, the solid fuel carburetor 12 includes a solid fuel supply means 6 for advancing the cake of solid, combustible fuel 8 into an operative position 10 in the mixing chamber 12, as is shown in FIGS. 2 and 5. A rotary brush means 14 is positioned proximate to the fuel supply means 6 and contacts the fuel cake 8, for abrasively removing fuel particles therefrom in the mixing chamber 12. An air supply means 16 is proximate to the brush means 14, for mixing air with the removed fuel particles forming a combustible mixture in the mixing chamber 12. A delivery means 18 is connected between the mixing chamber 12 and the internal combustion engine 4, for delivering the combustible mixture to the internal combustion engine 4.

The rotary brush 14 has a plurality of bristles 25 which are mounted on a backing 27 which is, in turn, mounted on a shaft 29 which is driven by the motor 20. The bristles 25 are composed of a material selected for its hardness, such as stainless steel or tungsten carbide. The bristles 25 serve to abrade the fuel cake 8 when it is in its operative position 10, as is shown in FIG. 2, thereby liberating usable fuel particles from the fuel cake.

The motor 20, which is connected by means of the shaft 29 to the backing 27 of the brush 14, drives the brush 14 into rotary motion.

Figure 3:
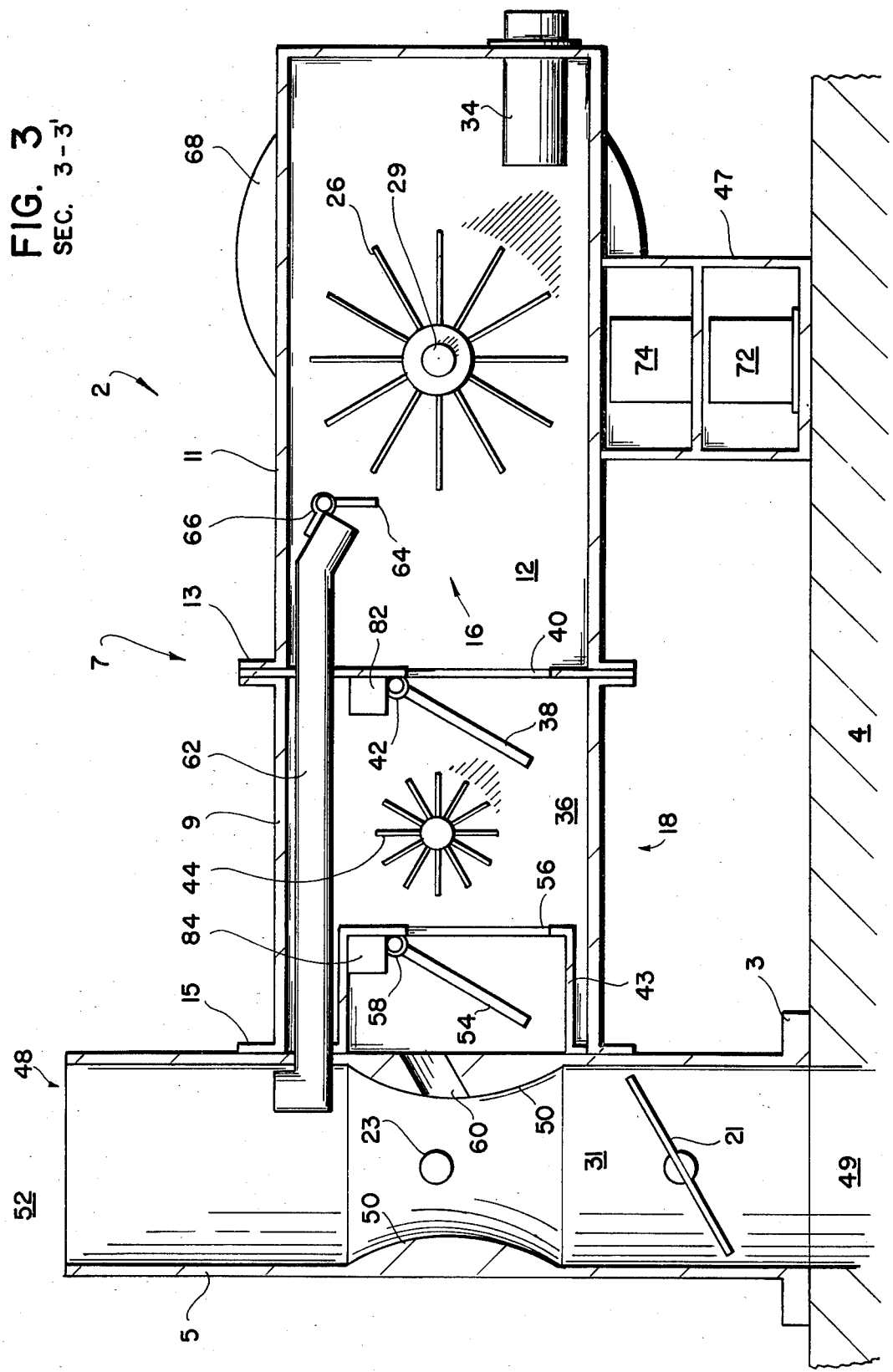
FIG. 3 is a front, cross-sectional view along the section line 3—3' of FIG. 2 of the fuel system invention.

An engine speed control means shown in FIG. 3 includes the throttle 21 and vacuum gauge 23 which are located in the throat 31 of the vertical housing 5.

Both air and fuel are drawn through the carburetor and into the engine 4 by the suction created by the pistons moving downward in the engine cylinders of the engine 4. As the piston moves down in the cylinder, a partial vacuum is created in the cylinder and the combustion chamber. It is the difference between the pressure within the engine cylinder and the atmospheric pressure in the ambient 52 outside of the carburetor which causes air and fuel to flow into the engine cylinder from the carburetor 2. In order to increase the difference in pressure, that is increase th vacuum within the throat 31 of the vertical housing 5, a Venturi, hourglass shaped constriction 50 is placed above the throat 31 in the housing 5 so that incoming air from the inlet 48 must pass through the Venturi restriction on its way to the intake manifold of the engine 4. The reduction area at the Venturi 50 increases the speed of the air that is passing through the throat 31 and produces a vacuum at its point of maximum restriction. It is at this point where the vacuum gauge 23 and the outlet port 60 for the swirl chamber 36 are located.

The throttle valve 21 controls the amount of air-fuel mixture passing through the throat 31, thereby controlling the speed of the engine 4. The throttle valve is a flat metal plate attached to a throttle shaft and, when closed, prevents air from passing through the carburetor, and when open, permits air to flow through. The quantity of the air flowing through the throat 31 when the throttle valve is open is determined by the degree of that opening. This is controlled by the accelerator pedal which is linked to the throttle shaft. When the throttle valve 21 is open, the low pressure in the throat 31 created by the pistons in the engine 4 creating a suction, results in air rushing down from the inlet 48 through the Venturi restriction 50, creating a suction on the vacuum gauge 23 and on the outlet port 60 for the swirl chamber 36.

The vacuum gauge 23 may be a manometer or anneroid type pressure gauge having an electrical resistive output 22 so that the higher the vacuum which is detected by the vacuum gauge 23, the lower the resistance of the resistor 22 associated therewith. As may be seen in FIG. 7a, the terminals of the motor 20 may be connected in series with the resistor 22 of the vacuum gauge 23 to the power source for the motor, which is shown as +V and ground voltages. In this manner the higher vacuum in the Venturi restriction 50 caused by the opening of the throttle valve 21 creates a higher vacuum at the vacuum gauge 23. This results in a lower resistance for the resistor 22, causing a greater current to flow through the motor 20, thereby providing the speed control for the brush 14. In this manner, an engine speed control means is provided which is connected to the motor 20 for increasing the speed of rotation of the brush means 14 in response to the input to the control means 22 for increased engine speed of the internal combustion engine 4.

A retreiver fan 24 is mounted on the shaft 29 as is shown in FIG. 2, proximate to the brush means 14 and is driven by the motor 20. The retreiver fan 24 retreives the fuel particles as they are removed from the fuel cake 8 by the brush means 14 and propels the particles into the mixing chamber 12. A mixing fan 26 is mounted on the shaft 29 in the mixing chamber 12 and is driven by a motor 20. The mixing fan 26 mixes the fuel particles propelled into the mixing chamber by the retreiver fan 24 with the air in the mixing chamber 12.

Figure 4:
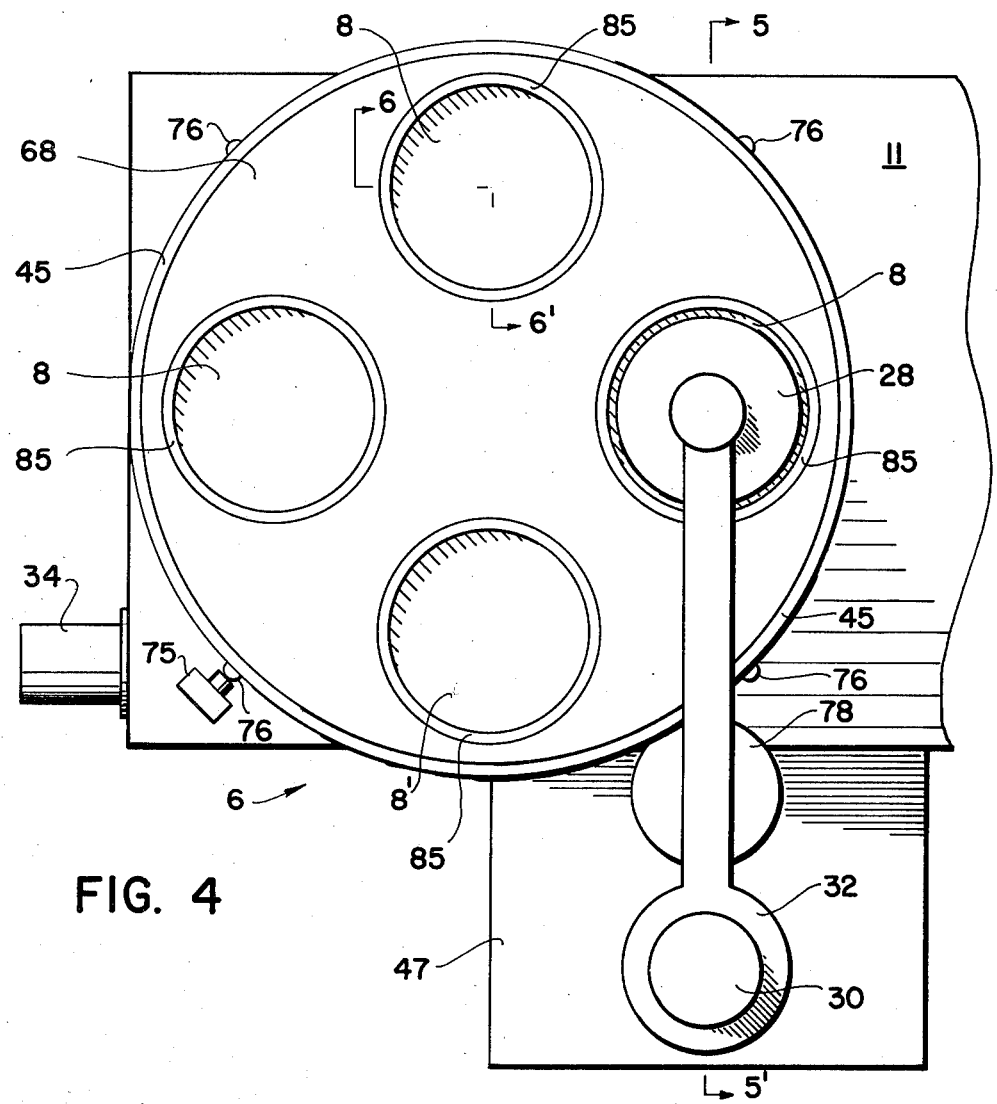
FIG. 4 is a back view of the fuel system invention.

The fuel supply means includes a plunger 28 which is shown in FIGS. 4 and 5, which operatively contacts the fuel cake 8 and advances it toward the brush means 14. A worm gear 30 threadably engages a helically threaded socket 32 for the plunger 28 and is rotatably driven by the motor 20 as is shown in more detail in FIG. 9. The worm gear 30 propels the plunger 28 which drives the fuel cake 8 against the brush means 14 at the operative location 10. Since both the worm gear 30 and the brush means 14 are driven by the motor 20, they both rotate at rates which are proportional to the demand input to the variable resistor 22 for engine speed in the internal combustion engine 4. Thus, when the throttle valve 21 is opened demanding greater engine speed, the vacuum gauge 23 detects a higher vacuum in the Venturi restriction 50 and creates a lower resistance in the resistor 22 which causes the motor 20 to rotate at a faster rate, driving the brush means 14 at a faster rate and advancing the fuel cake 8 into the brush means 14 at a more rapid rate, thereby producing a greater number of fuel particles per unit time in the mixing chamber 12.

An auxiliary tube 62 is connected between the ambient air 52 at the inlet 48 of the vertical housing 5 and the mixing chamber 12. The auxiliary tube 62 introduces a positive air pressure in the mixing chamber 12. The auxiliary tube 62 may be augmented by being connected with a supercharging source so that higher air pressures can be introduced into the mixing chamber 12, which is especially necessary for furnace applications. The auxiliary tube 62 may include a valve 64 which is mounted on the end auxiliary tube 62 and is spring loaded by means of a spring 66 to close the auxiliary tube passage. The tube valve 64 serves to prevent air under positive pressure in the mixing chamber 12 from flowing backward in the auxiliary tube 62 to the ambient 52.

The swirl chamber 36 is connected by means of the connecting port 40 to the mixing chamber 12, for maintaining the fuel particles suspended in the air therein. A mixing chamber outlet valve 38 is mounted over the port 40 and, in a first embodiment, is spring loaded by means of the spring 42 to be biased in an open position, for preventing the combustion mixture transferred from the mixing chamber 12 into the swirl chamber 36 from flowing backward into the mixing chamber 12.

Figures 7A, 7B, 8:
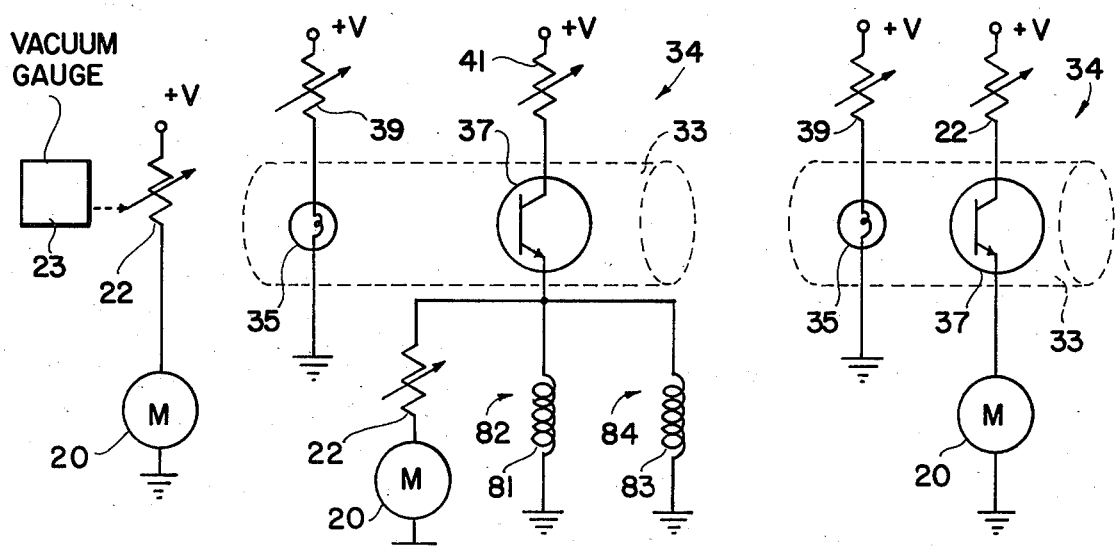
FIG. 7a is an electrical schematic diagram of the vacuum actuated, motor control resistor.
FIG. 7b is an electrical schematic diagram of the motor control and the fuel mixture control, using air valves to carry out the adjustment of the fuel to air ratio.
FIG. 8 is an electrical schematic diagram of an alternate embodiment of the fuel mixture control mechanism, which uses adjustments to the speed of the brush and the speed of the fuel cartridge advance mechanism to carry out the adjustment of the fuel to air ratio.

An electromechanical actuator 82 is connected to the mixing chamber outlet valve 38 as is shown in FIG. 3, for closing outlet valve 38 in response to an input signal, the electrical circuit for which is shown in FIG. 7b. A fuel particle density sensor 34 is mounted in the mixing chamber 12 and is connected to the input of the actuator 82, for sensing the ratio of fuel particles to air in the mixing chamber and outputting a sensing signal to the actuator 82. The actuator 82 will then close the outlet valve 38 in response to the sensor 34 detecting that the fuel to air ratio in the mixing chamber 12 is less than a predetermined value.

The fuel particle density sensor 34 is shown schematically in FIG. 7b and is similar to a conventional smoke detector. Its operation is based upon the Tyndall effect dealing with the light absorbtive power of an air suspension of particles. The device 34 consists of a small cylindrical chamber 33, shown in phantom lines, with open ends suspended in the mixing chamber 12. On one end of the cylindrical chamber 33 is a light source 35 connected between the positive and negative poles of a voltage source. On the other end of the cylindrical chamber 33 is a phototransistor 37, for example, an npn bipolar transistor having its collector connected to a positive potential, its emitter connected to a negative potential and its photosensitive base region exposed to the light from the light source 35. Connected between the negative terminal of the power source and the emitter of the phototransistor 37 is a field coil 81 for the actuator 82 and the field coil 83 for the actuator 84. The conductivity of the phototransistor 37 is directly proportional to the amount of light incident upon its base region from the light source 35. The concentration of fuel particles suspended in the air within the cylinder 33 directly effects the degree of absorbtion of the light emitted from the light source 35 in such a way that as the concentration of particles in the air increases, the amount of light reaching the phototransistor 37 decreases, thereby decreasing the amount of electrical current flowing through the coils 81 and 83 connected thereto. Thus it is seen that as the brush means 14 continues to produce fuel particles from the abraded fuel cake 8, the concentration of those fuel particles in the air within the mixing chamber 12 will increase, reducing the current flowing through coils 81 and 83. Since the spring 42 biases the mixing chamber outlet valve 38 open, reduced current flowing through the coil 81 will cause the mixing chamber outlet valve 38 to open up allowing some of the mixture from the mixing chamber 12 to flow into the swirl chamber 36, tending to reduce the concentration of fuel particles in the air in the mixing chamber 12. As is seen in FIG. 7*b*, in the first embodiment, the input terminal of the motor 20 connected through the variable resistor 22, is also connected to the emitter of the phototransistor 37. Thus it is seen that as the concentration of fuel particles in the air within the cylinder 33 increases, and the current flow through the phototransistor 37 decreases, the motor 20 will decrease its rate of rotation, thereby reducing the amount of abrasion of the brush means 14 on the fuel cake 8. This combination of actions will cause the fuel to air ratio for the mixture in the mixing chamber to decrease to a point of equilibrium which may be predetermined by prior adjustment to the choke resistor 39 and adjustment resistor 41 shown in FIG. 7*b*. If the fuel to air ratio for the mixture in the mixing chamber decreases below the predetermined level, more light from the light source 35 is incident on the base region of the phototransistor 37, causing a greater current to flow through the coil 81 which tends to close the mixing chamber outlet valve 38 and greater current flows through the motor 20 which creates greater abrasion of the brush means 14 on the fuel cake 8, the combination of events serving to increase the fuel to air ratio for the mixture in the mixing chamber 12.

When the fuel mixture control 34 is operating in equilibrium and the throttle valve 21 is opened demanding greater speed of the engine 4, a greater quantity of air will be introduced by the auxiliary tube 62 in the mixing chamber reducing the fuel to air ratio within the mixing chamber. This will increase the amount of light incident on the phototransistor 37 and will increase the amount of current flowing through the coil 81 and through the motor 20. The increased current through the coil 81 will cause the actuator 82 to partially close the mixing chamber outlet valve 38. Since a greater quantity of air is now flowing through the Venturi 50 in the vertical housing 5, the vacuum gauge 23 will cause the variable resistor 22 to provide a still greater amount of current to the motor 20. The greater amount of current to the motor 20 causes it to advance the fuel cake 8 at a faster rate and rotate the brush means 14 at a faster rate which produces more particles within the mixing chamber 12. Because the mixing chamber outlet valve 38 has shut down partially, the fuel to air ratio of the mixture in the mixing chamber 12 increases rapidly back up to the predetermined value, which gradually causes a reduction in the current flowing through the coil 81 and the motor 20 so that an equlibrium point is reached where a fuel to air mixture at the desired predetermined ratio is produced at a higher rate to be delivered to the engine 4 which will be operating at a higher rate of speed.

The swirl chamber 36 has a mounting structure 43 enveloping the outlet 60 to the Venturi restriction 50, which has an outlet port 56 which is covered by a swirl chamber outlet valve 54 which is spring biased in an open position by the spring 58 and which is actuated by the mechanical actuator 84. The outlet 56 enables the introduction of the combustible mixture from the swirl chamber to the engine 4. The swirl chamber outlet valve 54 prevents the combustible mixture transferred from the swirl chamber 36 to the Venturi restriction 50 from flowing back into the swirl chamber 36. The second electromechanical actuator 84 is actuated by the coil 83 in the same manner as was described for the first actuator 82, so that when a greater electric current flows through the coil 83, the swirl chamber outlet valve 54 is shut down over the swirl chamber outlet port 56. The second mechanical actuator 84 is connected to the swirl chamber outlet valve 54, for closing the swirl chamber outlet valve in response to the input signal. The fuel particle density sensor 34 has an output connected to the input of the second actuator 84, for outputting a sensing signal to the second actuator 84. The second actuator 84 closes the swirl chamber outlet valve 54 in response to the sensor detecting that the fuel to air ratio is less than a predetermined magnitude.

The swirl chamber 36 can include a swirl chamber pump 44 which is driven by a vibratory motor 46, for circulating the air in the swirl chamber 36 so as to maintain the fuel particles in suspension therein.

An alternate embodiment of the invention will now be described for the mixture control. In the alternate embodiment, as shown in FIG. 8, the output of the fuel particle density sensor 34 is connected only to the motor 20 and the motor speed control resistor 22. The fuel particle density sensor 34 operates in the same manner as previously described to sense the ratio of the fuel particles to air in the mixture chamber 12 and to output sensing signals to the motor 20. The rate of rotation of the motor 20 increases in response to the sensor 34 detecting that fuel to air particle ratio is less than a predetermined magnitude. In this alternate embodiment, the first electromechanical actuator 82 is disabled and the spring 42 is biased to maintain the mixing chamber outlet valve 38 in a closed position. Furthermore, in this alternate embodiment, the second electromechanical actuator 84 is disabled and the spring 58 is biased to maintain the swirl chamber outlet valve 54 in its closed position. The spring bias for the springs 42 and 58 is adjusted so that the increased vacuum pressure at the outlet port 60 when the throttle valve 21 is open increasing the velocity of the air passing through the Venturi restriction 50, draws the valves 38 and 54 open to a sufficient degree to permit the desired flow of the fuel mixture from the mixing chamber 12. The motor speed control resistor 22 is connected to the motor 20 as is shown in FIG. 8 so that at the same time that the valves 38 and 54 are drawn open by the increased vacuum in the Venturi 50, the resistance of the resistor 22 is reduced creating a greater current flow to the motor 20, increasing its speed and thereby increasing a production of fuel particles in the mixing chamber 12. When the concentration of the fuel particles in the mixing chamber 12 approaches a predetermined value, the phototransistor 37 operates as previously described to reduce the current flowing through the motor 20 and thus reduce the rate of rotation of the motor 20 so that an equilibrium fuel to air ratio is achieved in the mixing chamber 12.

The embodiments in both FIG. 7b and FIG. 8 show the choke resistor 39 which adjusts the amount of electrical current passing through the light 35. When a cold engine 4 is being started it requires a richer fuel to air mixture. To accomplish this, the resistance of the choke resistor 39 is reduced, thereby in creasing the amount of light emitted by the light 35, thereby increasing the density of particles which must accumulate in the air within the cylindrical chamber 33 before the phototransistor 37 will reduce the electrical current passing through the motor 20. Although the adjustment to the variable resistor 39 can be manually operated, an automatic choke control can be provided which may be a combination of a thermostatic bimetal coil spring and vacuum operated piston, as conventionally employed.

Figure 9:
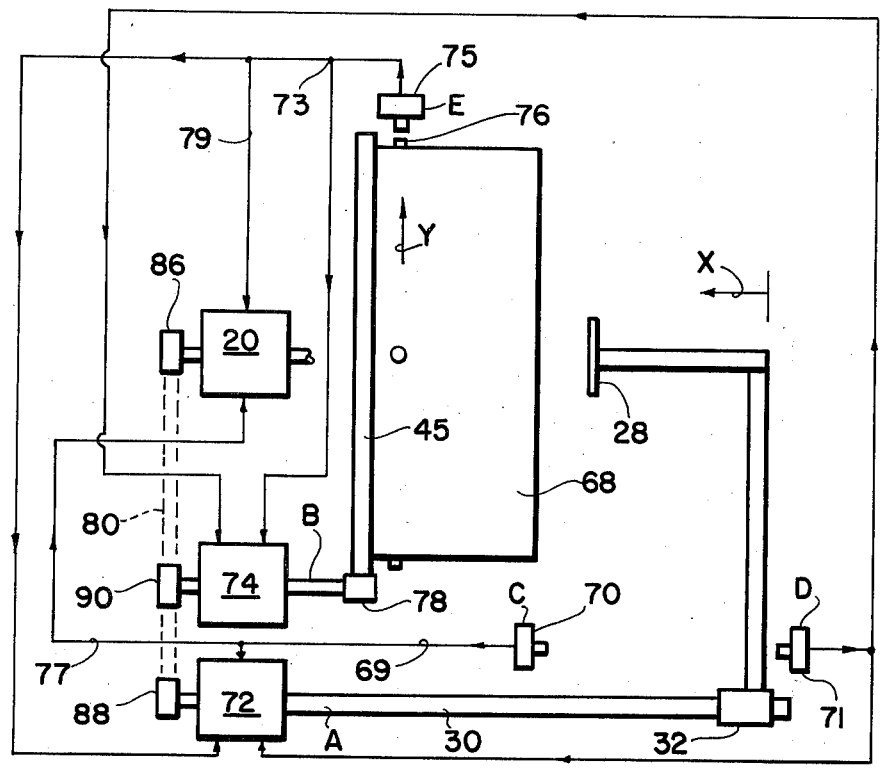
FIG. 9 is an electrical and mechanical schematic diagram of the fuel cake supply mechanism.
Figure 10:
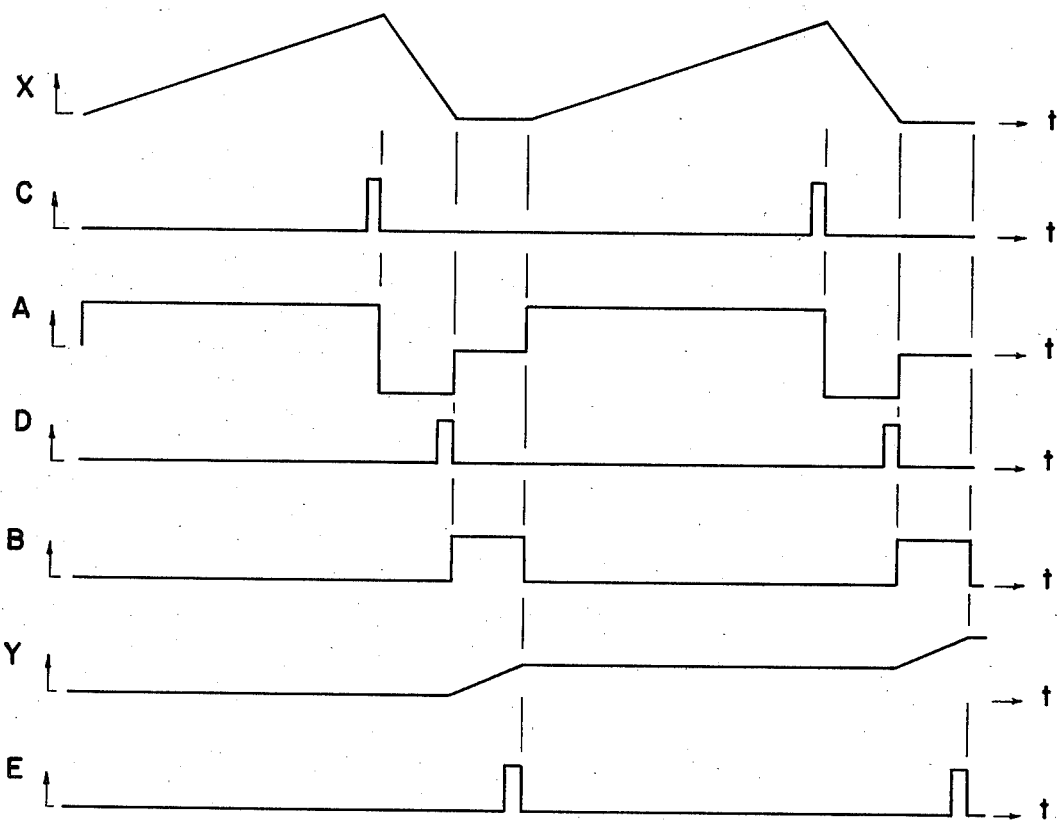
FIG. 10 is a timing diagram for the elements shown in FIG. 9.

As may be seen in FIGS. 4 and 5, the fuel supply means 6 includes a drum 68 which is rotatably mounted to the mixing chamber 12 and which holds a plurality of fuel cakes 8, with a first one of the cakes 8 juxtaposed between the plunger 28 and the brush means 14. FIG. 9 illustrates a spent cake sensing means which includes the switch 70 which is mounted proximate to the plunger 28 at the point at which the plunger has fully advanced the fuel cake 8 toward the brush means 14 so that the fuel cake has been almost entirely consumed. The spent cake sensing means 70 senses when the first cake 8 has been consumed by abrasion with the brush means 14. FIG. 10 is a timing diagram illustrating the operation of the elements of the fuel supply means 6. The waveform labeled x corresponds to the x displacement of the plunger 28 toward the brush means 14. It is seen that when the plunger 28 has advanced fully toward the brush means 14, the switch 70 is tripped as is seen from the waveform labeled c in FIG. 10. The worm gear 30 is driven through an electrically shiftable transmission 72 which, in turn, is driven by the motor 20 through drive wheel 88 and belt 80, as is shown in FIGS. 5 and 9. The forward rotation of the output of the transmission 72 is shown as the waveform labeled A in FIG. 10. In a first embodiment, the motor 20 has a first control input 77 connected to the spent cake sensing means switch 70, for reversing the direction of rotation of the first motor 20, which reverses the direction of motion of the worm gear 30 and withdraws the plunger 28 from the first fuel cake 8. This is shown by the waveform diagram A in FIG. 10 which shows the backward motion of the output of the transmission 72 in response to the C waveform pulse from the switch 70 having reversed the direction of rotation of the motor 20. The resultant motion of the plunger 28 in the negative x direction is shwon with the x waveform in this time period.

The rotary motion transmission 74 also has its input driven by the motor 29 through drive wheel 90 and belt 80, as is shown in FIGS. 5 and 9. Both transmissions 72 and 74 are contained in the transmission housing 47, shown in FIG. 5. The spent cake sensing means second switch 71 is positioned so as to be contacted by the plunger 28 after it has fully withdrawn from the drum 68. This operation is shown by the waveform labeled D in FIG. 10 which is the waveform of the switch 71 when contacted by the plunger 28. The output of the switch 71 is connected to the electrical control input of the first transmission 72 and places the first transmission 72 in neutral, stopping the rotation of the worm gear 30. The output of the switch 71 is also connected to the second transmission 74 which, in response to the signal D received from the switch 71, commences to transfer the backward rotary motion of the motor 20 to the ring gear 45 of the drum 68 through the drive gear 78. This rotates the drum 68 so as to position a second fuel cake 8' in juxtaposition between the plunger 28 and the brush means 14. Four projections 76 on the drum 68 rotate along with the rotation of the drum and, for four equally spaced fuel cakes 8, become respectively juxtaposed with a switch 75 after each 90° for rotation for the drum 68, represented by the waveform y in FIG. 10. Switch 75, as shown in FIG. 9, has a connection 73 to the second transmission 74, which provides the electrical control signal E shown in FIG. 10 which places the second transmission 74 in neutral so that the drum 68 now ceases its rotation. The output of the switch 75 is also connected by the connection 79 to the motor 20 and serves to reverse the rotation of the motor 20 into its forward direction. The output of the switch 75 is also connected by connection 73 to the first transmission 72 and the electrical signal waveform E shifts the first transmission 72 so as to transfer the forward rotary motion of the motor 20 to the worm gear 30, thereby starting the forward advance of the plunger 28 toward the newly positioned fuel cake 8', pressing the second fuel cake 8' against the brush means 14 to continue the supply of fuel mixture to the engine 4.

The solid fuel cake 8 of FIG. 6 may be compressed within a cylindrical cartridge 85 which can be choke bored at the operative end 87 to provide some frictional resistance to the plunger 28 when advancing the fuel cake 8 through the cartridge 85. A spring 89 of the compression type, may be mounted on the operative end 87 of the cartridge 85 so that the fuel cake 8 is withdrawn away from the operating position 10 at the face of the brush means 14 when the plunger 28 has ceased its forward motion.

In a second embodiment of the invention, the motor 20 is not caused to reverse its direction of motion, but instead the first transmission 72 uses the electrical signal C shown in FIG. 10 to switch its output rotation from forward to backward motion and uses the electrical signal D as shown in FIG. 10 to switch its output rotation from backward motion to neutral and uses the wave form E of FIG. 10 to switch its output rotation from neutral to forward motion.

The drum 68 serves as a magazine for the fuel cartridges 85 which has two embodiments that can be selectively replaced when the fuel cakes have been spent. Both embodiments are illustrated in FIG. 2.

The first embodiment has the pivot 17 as a screw which screws into the sidewall 11 of the mixing chamber 12 in FIG. 2. The screw can be accessed from the outer end of the drum 68. The screw 17 pivotally holds the drum 68 to the sidewall 11.

In the second embodiment, the pivot 17 need not be demountable. Instead, the drum 68 comprises a first cylinder 61 having a closed end rotatably mounted at its center 17 to the mixing chamber 12, and an opposed open end. The drum 68 further includes a fastener 63 mounted on the first cylinder 61 proximate to the open end. The drum further includes a second cylinder 65 having an open end which mates with the open end of the first cylinder and is fastened to it by the fastener 63, and a closed end opposed to the open end of the second cylinder. The closed end of the second cylinder includes a plurality of perforation disposed about its periphery, each respectively forming a socket 67 within which one of the fuel cakes 8 is slideably mounted. In this manner, the second cylinder can be selectively removed from the first cylinder and replaced when the fuel cakes are spent.

The principals of operation for the carburetor 2 which has been described above can also be applied to providing the fuel to air mixture to a furnace combustion chamber, substituting for the conventional fuel oil carburetors now in use. A positive pressure air supply such as would be provided by a fan, is directed into the inlet port 48 of the carburetor 2 to provide the desired air flow.

Although specific embodiments of the invention have been described, it will be understood by those having skill in the art that minor changes can be made in the selection of materials and in the structure and operation of these embodiments, without departing from the spirit and the scope of the invention.

What is claimed is:

1. A solid fuel carburetor for an internal combustion engine, comprising:
   a solid fuel supply means for advancing a cake of solid, combustible fuel into an operative position in a mixing chamber;
   a rotary brush means proximate to said fuel supply means and contacting said fuel cake, for abrasively removing fuel particles therefrom in said mixing chamber;
   an air supply means proximate to said brush means, for mixing air with said removed fuel particles forming a combustible mixture in said mixing chamber;
   a delivery means connected between said mixing chamber and said internal combustion engine, for delivering said combustible mixture to said internal combustion engine;
   said delivery means further comprising,
      a swirl chamber connected to the output of said mixing chamber, for maintaining said fuel particles suspended in the air; an air inlet having a Venturi restriction therein, connecting the ambient air to said internal combustion engine; said swirl chamber having an outlet in the wall of said Venturi restriction, for introducing said combustible mixture into said engine;
   a mixing chamber outlet valve mounted between said mixing chamber and said swirl chamber, for preventing said combustible mixture transferred from said mixing chamber into said swirl chamber from flowing back into said mixing chamber;
   an electromechanical actuator connected to said mixing chamber outlet valve, for closing said outlet valve in response to an input signal;
   a fuel particle density sensor mounted in said mixing chamber and connected to said input of said actuator, for sensing the ration of fuel particles to air in said mixture and outputting a sensing signal to said actuator;
   said actuator closing said outlet valve in response to said sensor detecting that said fuel to air ration is less than a predetermined magnitude;
   a swirl chamber outlet valve mounted between said swirl chamber and said Ventury restriction, for preventing said combustible mixture transferred from said swirl chamber to said Venturi restriction from flowing back into said swirl chamber.

2. The apparatus of claim 1, which further comprises:
   a second electromechanical actuator connected to said swirl chamber outlet valve, for closing said swirl chamber outlet valve in response to an input signal;
   said fuel particle density sensor having an output connected to said input of said second actuator, for outputting a sensing signal to said second actuator;
   said second actuator closing said swirl chamber outlet valve in response to said sensor detecting that said fuel to air ratio is less than a predetermined magnitude.

3. The apparatus of claim 2, which further comprises:
   a first motor connected to said rotary brush means for driving said brush means;
   an engine speed control means connected to said motor having a speed demand input, for increasing the speed of rotation of said brush means in response to the demand input to said control means for increased engine speed.

4. The apparatus of claim 3, which further comprises:
   said fuel particle density sensor connected to an input of said engine speed control means, for sensing the ratio of fuel particles to air in said mixture and outputting a sensing signal to said engine speed control means;
   said engine speed control means increasing the rate of rotation of said first motor in response to said sensor detecting that said fuel to air particle ratio is less than a predetermined magnitude.

5. The apparatus of claim 3, which further comprises:
   a retreiver fan mounted proximate to said brush means and driven by said first motor, for retreiving said fuel particles as they are removed from said fuel cake by said brush means, and propelling said particles into said mixing chamber.

6. The apparatus of claim 5, which further comprises:
   a mixing fan mounted in said mixing chamber and driven by said first motor, for mixing said fuel particles propelled into said mixing chamber by said retreiver fan, with the air in said mixing chamber.

7. The apparatus of claim 6, which further comprises:
   an auxiliary tube means connected between ambient air and said mixing chamber, for introducing a positive air pressure into said mixing chamber.

8. The apparatus of claim 7, which further comprises:
   a swirl chamber pump connected to said swirl chamber, for circulating the air in said swirl chamber to maintain said fuel particles suspended therein.

9. The apparatus of claim 8, which further comprises:

an auxiliary tube valve mounted in said auxiliary tube, for preventing said air in said mixing chamber from flowing back in said auxiliary tube to said ambient.

10. The apparatus of claim 7, wherein said fuel supply means further comprises:
- a plunger operatively contacting said fuel cake, for advancing said cake toward said brush means;
- a worm gear threadably engaging said plunger and rotatably driven by said first motor, for driving said fuel cake against said brush means;
- whereby said plunger drives said fuel cake against said brush means and said brush means rotates at rates proportional to said demand for engine speed.

11. The apparatus of claim 10, which further comprises:
- a drum rotatably mounted to said mixing chamber, holding a plurality of said fuel cakes, with a first one of said cakes juxtaposed between said plunger and said brush means;
- a spent cake sensing means mounted proximate to said plunger, for sensing when said first cake has been consumed by abrasion with said brush means;
- a first rotary motion transmission means connected to and driven by said first motor and connected to a driving said worm gear, having an input connected to said spent cake sensing means, for reversing the motion of said worm gear and withdrawing said plunger from said first cake;
- a second rotary motion transmission means motively driven by said first motor in response to a signal from an input connected to said spent cake sensing means, for rotating said drum to position a second fuel cake in juxtaposition between said plunger and said brush means;
- said first transmission means having an input connected to said drum for controlling said first transmission to advance said plunger driving said second fuel cake against said brush means in response to said drum completing said rotation.

12. The apparatus of claim 10, which further comprises:
- a drum rotatably mounted to said mixing chamber, holding a plurality of said fuel cakes, with a first one of said cakes juxtaposed between said plunger and said brush means;
- a spent cake sensing means mounted proximate to said plunger, for sensing when said first cake has been consumed by abrasion with said brush means;
- said first motor having a first control input connected to said spent cake sensing means, for reversing the direction of rotation of said first motor, reversing the motion of said worm gear and withdrawing said plunger from said first fuel cake;
- a rotary motion transmission means motively driven by said first motor in response to a signal from an input connected to said spent cake sensing means, for rotating said drum to position a second fuel cake in juxtaposition between said plunger and said brush means;
- said first motor having a second input connected to said drum for controlling said first motor to rotate forwardly to advance said plunger driving said second cake against said brush means in response to said drum completing said rotation.

13. A solid fuel carburetor for an internal combustion engine, comprising:
- a solid fuel supply means for advancing a cake of solid, combustible fuel into an operative position in a mixing chamber;
- a rotary brush means proximate to said fuel supply means and contacting said fuel cake, for abrasively removing fuel particles therefrom in said mixing chamber;
- an air supply means proximate to said brush means, for mixing air with said removed fuel particles forming a combustible mixture in said mixing chamber;
- a delivery means connected between said mixing chamber and said internal combustion engine, for delivering said combustible mixture to said internal combustion engine;
- a first motor connected to said rotary brush means for driving said brush means;
- an engine speed control means connected to said motor having a speed demand input, for increasing the speed of rotation of said brush means in response to the demand input to said control means for increased engine speed;
- a retreiver fan mounted proximate to said brush means and driven by said first motor, for retreiving said fuel particles as they are removed from said fuel cake by said brush means, and propelling said particles into said mixing chamber;
- said air supply means being comprised of a mixing fan mounted in said mixing chamber and driven by said first motor, for mixing said fuel particles propelled into said mixing chamber by said retreiver fan, with the air in said mixing chamber;
- said fuel supply means further comprises,
- a plunger operatively contacting said fuel cake, for advancing said cake toward said brush means;
- a worm gear threadably engaging said plunger and rotatably driven by said first motor, for driving said fuel cake against said brush means;
- whereby said plunger drives said fuel cake against said brush means and said brush means rotates at rates proportional to said demand for engine speed.

14. The apparatus of claim 13, which further comprises:
- a drum rotatably mounted to said mixing chamber, holding a plurality of said fuel cakes, with a first one of said cakes juxtaposed between said plunger and said brush means;
- a spent cake sensing means mounted proximate to said plunger, for sensing when said first cake has been consumed by abrasion with said brush means;
- a first rotary motion transmission means connected to and driven by said first motor and connected to and driving said worm gear, having an input connected to said spent cake sensing means, for reversing the motion of said worm gear and withdrawing said plunger from said first cake;
- a second rotary motion transmission means motively driven by said first motor in response to a signal from an input connected to said spent cake sensing means, for rotating said drum to position a second fuel cake in juxtaposition between said plunger and said brush means;
- said first transmission means having an input connected to said drum for controlling said first transmission to advance said plunger driving said second fuel cake against said brush means in response to said drum completing said rotation.

15. The apparatus of claim 13, which further comprises:
- a drum rotatably mounted to said mixing chamber, holding a plurality of said fuel cakes, with a first one of said cakes juxtaposed between said plunger and said brush means;
- a spent cake sensing means mounted proximate to said plunger, for sensing when said first cake has been consumed by abrasion with said brush means;
- said first motor having a first control input connected to said spent cake sensing means, for reversing the direction of rotation of said first motor, reversing the motion of said worm gear and withdrawing said plunger from said first fuel cake;
- a rotary motion transmission means motively driven by said first motor in response to a signal from an input connected to said spent cake sensing means, for rotating said drum to position a second fuel cake in juxtaposition between said plunger and said brush means;
- said first motor having a second input connected to said drum for controlling said first motor to rotate forwardly to advance said plunger driving said second cake against said brush means in response to said drum completing said rotation.

16. The apparatus of claim 13, which further comprises:
- a drum rotatably mounted to said mixing chamber, holding a plurality of said fuel cakes, with a first one of said cakes juxtaposed between said plunger and said brush means.

17. The apparatus of claim 16, wherein said drum further comprises:
- a fastener mounting said drum to said mixing chamber, for enabling the selective replacement of said drum when said fuel cakes are spent.

18. The apparatus of claim 16, wherein said drum further comprises:
- a first cylinder having a closed end rotatably mounted at its center to said mixing chamber, and an opposed open end;
- a fastener mounted on said first cylinder proximate to said open end;
- a second cylinder having an open end which mates with said open end of said first cylinder and is fastened thereto by said fastener, and a closed end opposed to said open end of said second cylinder;
- said closed end of said second cylinder including a plurality of perforations disposed about the periphery thereof, each respectively forming a socket within which one of said fuel cakes is slideably mounted;
- whereby said second cylinder can be selectively removed from said first cylinder and replaced when said fuel cakes are spent.

19. The apparatus of claim 13, which further comprises:
- a fuel particle density sensor mounted in said mixing chamber and connected to an input of said engine speed control means, for sensing the ratio of fuel particles to air in said mixture and outputting a sensing signal to said engine speed control means;
- said engine speed control means increasing the rate of rotation of said first motor in response to said sensor detecting that said fuel to air particle ratio is less than a predetermined magnitude.

20. The apparatus of claim 19, wherein said delivery means further comprises:
- a swirl chamber connected to the output of said mixing chamber, for maintaining said fuel particles suspended in the air.

21. The apparatus of claim 20, which further comprises:
- a swirl chamber pump connected to said swirl chamber, for circulating the air in said swirl chamber to maintain said fuel particles suspended therein.

22. The apparatus of claim 21, wherein said delivery means further comprises:
- an air inlet having a Venturi restriction therein, connecting the ambient air to said internal combustion engine;
- said swirl chamber having an outlet in the wall of said Venturi restriction, for introducing said combustible mixture into said engine.

23. The apparatus of claim 22, wherein said air inlet further comprises:
- an auxiliary tube means connected between ambient air and said mixing chamber, for introducing a positive air pressure into said mixing chamber.

24. The apparatus of claim 23, which further comprises:
- an auxiliary tube valve mounted in said auxiliary tube, for preventing said air in said mixing chamber from flowing back in said auxiliary tube to said ambient.

25. The apparatus of claim 24, which further comprises:
- a mixing chamber outlet valve mounted between said mixing chamber and said swirl chamber, for preventing said combustible mixture transferred from said mixing chamber into said swirl chamber from flowing back into said mixing chamber.

26. The apparatus of claim 25, which further comprises:
- a swirl chamber outlet valve mounted between said swirl chamber and said Venturi restriction, for preventing said combustible mixture transferred from said swirl chamber to said Venturi restriction from flowing back into said swirl chamber.

* * * * *